United States Patent [19]

Epworth

[11] Patent Number: 4,533,247
[45] Date of Patent: Aug. 6, 1985

[54] OPTICAL TRANSMISSION SYSTEM

[75] Inventor: Richard E. Epworth, Bishop's Stortford, England

[73] Assignee: International Standard Electric Corporation, New York, N.Y.

[21] Appl. No.: 410,741

[22] Filed: Aug. 23, 1982

[30] Foreign Application Priority Data

Sep. 3, 1981 [GB] United Kingdom ............... 8126695

[51] Int. Cl.³ .............................................. G01B 9/02
[52] U.S. Cl. .................... 356/345; 356/346; 356/352; 356/358
[58] Field of Search ............... 356/346, 357, 358; 250/231 R, 231 P

[56] References Cited

U.S. PATENT DOCUMENTS 3,319,515  5/1967  Flournoy .......................... 356/357
4,329,058  5/1982  James et al. ..................... 356/357 X
4,355,898  10/1982  Dakin ............................... 356/346

FOREIGN PATENT DOCUMENTS 962835  2/1975  Canada ............................ 356/357
2020830  11/1970  Fed. Rep. of Germany ...... 356/346
789688  12/1980  U.S.S.R. ........................... 356/346

OTHER PUBLICATIONS

Ramsay et al., "Communication Using Frequency-Modulated Light", Proc. I. R. E. Australia, pp. 673–677, Sep. 1963.
Goedgebuer et al., "Construction of an Interferometric Gauge . . . " Optics and Laser Technology, vol. 10, No. 4, pp. 193–196, 8/78.

Primary Examiner—Davis L. Willis
Assistant Examiner—Matthew W. Koren
Attorney, Agent, or Firm—John T. O'Halloran; Peter R. Ruzek

[57] ABSTRACT

An optical transmission system comprises a light source, which may be coherent or incoherent, a first optical interferometer wherein light from the source is modulated, an optical path, which may be either free space or an optical fiber, along which the modulated output of the first interferometer is propagated, a second interferometer wherein light received from the optical path is demodulated, and a photodetector to which the demodulated output is applied. Typically the first interferometers is a Fabry-Perot etalon, the length of the resonant cavity of which can be altered to modulate light applied thereto.

12 Claims, 20 Drawing Figures

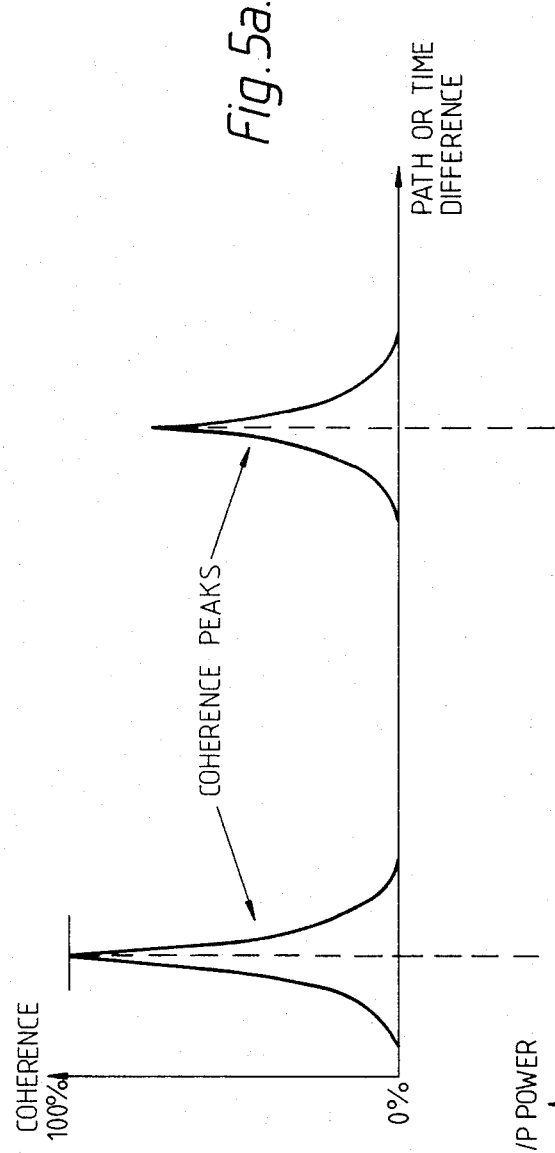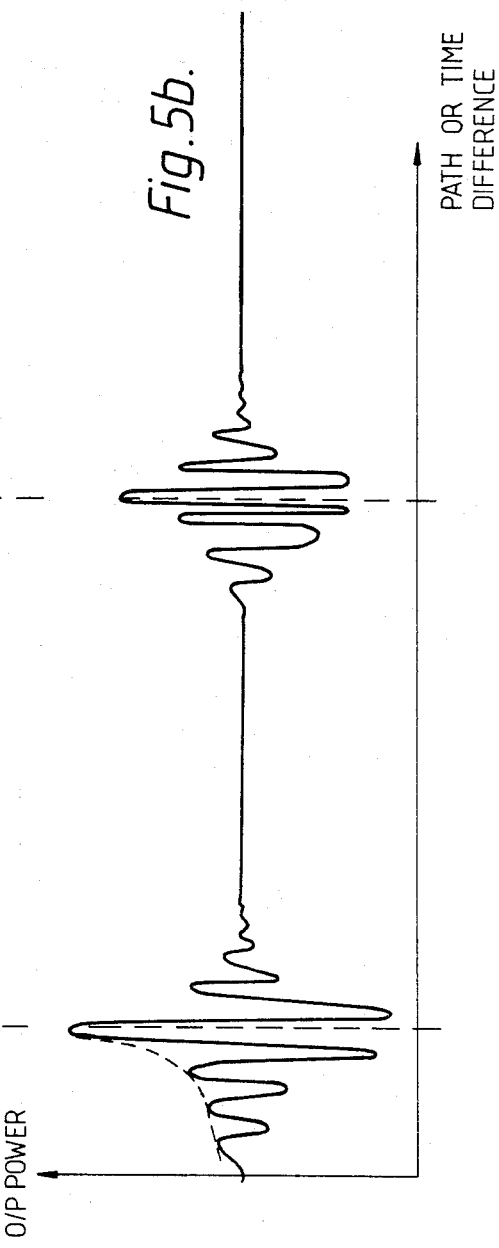

OPTICAL TRANSMISSION SYSTEM

BACKGROUND OF THE INVENTION

The present invention relates to optical transmission systems and is particularly suited for use in telemetry.

With the advent of optical fibers and semiconductor light sources and photodetectors many new optical transmission systems have been developed. A common approach is to use light sources, e.g. a light emitting diode (LED) or semiconductor laser, which can be intensity modulated directly by an electrical current. However, the approaches taken so far leave much to be desired in terms of simplicity of equipment and reliability of operation thereof, as well as the accuracy of the obtained results.

SUMMARY OF THE INVENTION

Accordingly, it is a general object of the present invention to avoid the disadvantages of the prior art.

More particularly, it is an object of the present invention to develop an optical transmission system of the type here under consideration which does not possess the disadvantages of the conventional optical transmission systems.

Still another object of the present invention is to so design the optical transmission system of the above type as to be simple in construction, relatively inexpensive to manufacture, easy to use, and reliable and accurate in operation nevertheless.

In pursuance of these objects and others which will become apparent hereafter, one feature of the present invention resides in an optical transmission system comprising a light source, a first interferometer wherein light from the source can be modulated, the optical output of the first interferometer being propagated along an optical path to a second interferometer wherein the optical input can be demodulated, the output of the second interferometer being applied to photodetector means.

BRIEF DESCRIPTION OF THE DRAWING

Above-mentioned and other features and objects of this invention will become more apparent by reference to the following description taken in conjunction with the accompanying drawings, in which:

FIGS. 5a and 5b are graphic representations respectively of the coherence function and the receiver interferometer output as the transmitter interferometer path difference is changed;

DETAILED DESCRIPTION OF THE DRAWING

Figure 1:
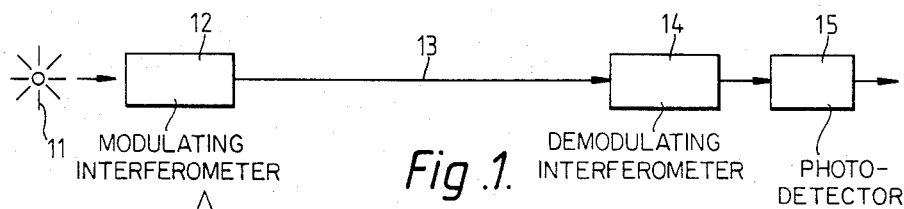
FIG. 1 is a diagrammatic view illustrating an optical transmission system utilizing the basic principle of the invention.

Referring now to the drawing in detail, it may be seen that an optical transmission system shown in FIG. 1 comprises a light source 11, a first interferometer 12 wherein light from the source 11 can be modulated, an optical path 13 along which the output of interferometer 12 is propagated, a second interferometer 14 wherein the light received from the path 13 can be demodulated, and a photodetector 15 to which the demodulated output is applied. The light source 11 can be incoherent, e.g. a conventional incandescent filament bulb or a light emitting diode. The system can, of course, also operate with a more coherent light source 11. The interferometers 12 and 14 may be of the two-path type, e.g. Michelson interferometer, or of the multipath type, e.g. Fabry-Perot etalon. The optical path can be either a free space path or a guided path, e.g. an optical fiber.

Figure 2A:
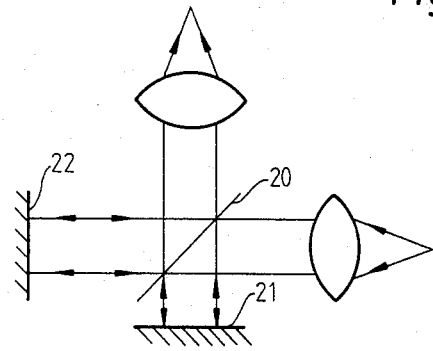
FIGS. 2a and 2b are diagrammatic view of two-path interferometers usable in the system of FIG. 1.
Figure 2B:
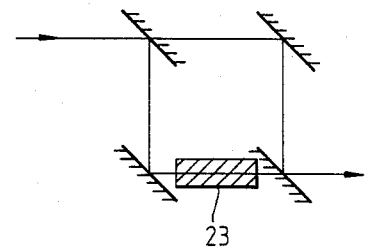

FIG. 2a illustrates modulation of a beam of light in a Michelson interferometer. The incoming light is split into two paths by a beam splitting mirror 20 and reflected from two mirrors 21 and 22 before being recombined into the output beam. Modulation can be effected by movement of one of the two mirrors 21 and 22, such as by moving the mirror 21. Alternatively, it is possible to interpose in one of the two paths means which is not shown and which is operative for changing the refractive index to produce an effective change in the path length. FIG. 2b illustrates modulation of a beam of light in a Mach-Zehnder interferometer. Means 23 for changing the refractive index to effect a change in path length is interposed in one of the two light paths in the interferometer.

Figure 3A:
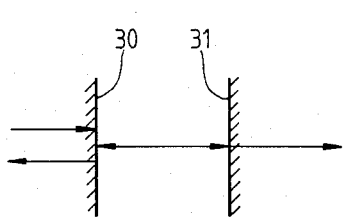
FIGS. 3a and 3c are diagrammatic views of implementions of modulating transducers for use in the system of FIG. 1.
Figure 3B:
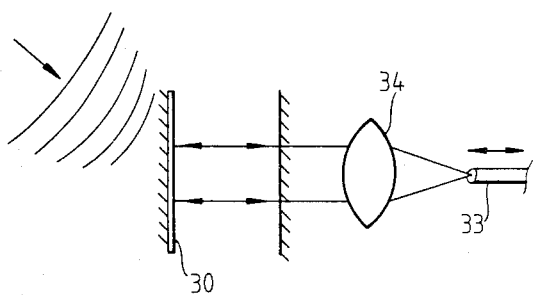
Figure 3C:
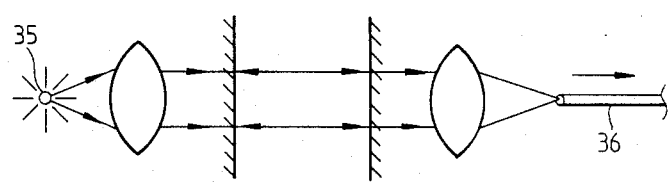

FIG. 3a illustrates the basic Fabry-Perot etalon structure. Incident light enters a resonant cavity formed of two partially reflecting mirrors 30 and 31. Interference occurs between the mirrors 30 and 31 during multiple reflections. Some of the light is transmitted onwards through the mirror 31 while some of the light is returned towards the source through the mirror 30. Modulation can be effected by altering the resonant cavity length, e.g. by movement of one of the mirrors 30 and 31. FIG. 3b illustrates how one mirror 30 may be mounted on a transducer, e.g. a microphone diaphragm. The incident light is coupled into, and the modulated light coupled out of, the resonant cavity by an optical fiber 33 and a lens 34. FIG. 3c shows how an etalon can be interposed between a light source 35 and an optical fiber 36. Modulation is effected by altering the mirror spacing or the refractive index of the medium between two fixed mirrors 30 and 31.

When information is impressed on the light by modulating the optical path difference in an interferometer, this has the effect of changing the spectrum of the transmitted light.

Figure 4A:
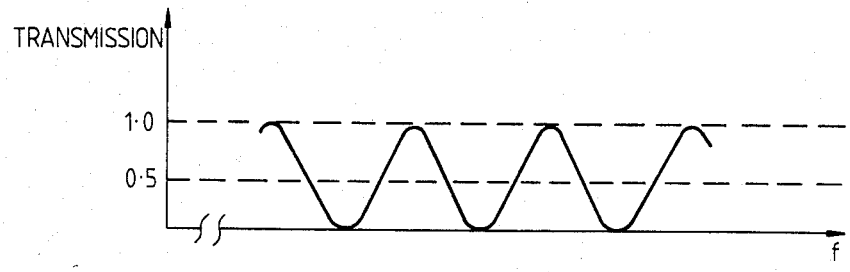
FIGS. 4a and 4b are graphic representations of combfilter responses of interferometers.
Figure 4B:
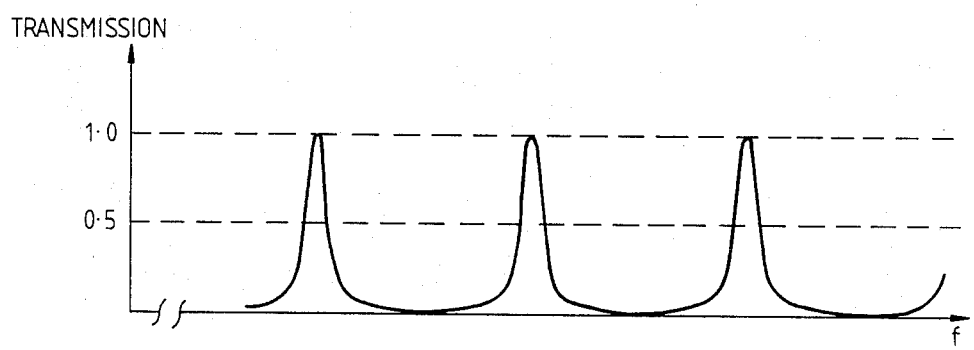

The light output from the interferometer 12 is a comb spectrum. For the two path interferometer 12, the pass bands are of equal width to the stop bands, as shown in FIG. 4a; for the multi-path interferometer 12, the transmitted pass bands are narrower than the stop bands as depicted in FIG. 4b.

The demodulator is a second interferometer 14 used as a time delay frequency demodulator. Although the light source 11 may be incoherent, the transmitter interferometer 12 has impressed some coherence at a time corresponding to the delay between the two paths. The coherence function of the transmitted light is shown in FIG. 5a.

FIG. 5b shows the output of the second interferometer 14 when either the first or second interferometer path differences are changed. There are discrete regions where interference may be detected, these regions being situated where the path differences of the two interferometers 12 and 14 are similar. The difference between the two differences must be kept within the coherence time of the original light source if interference is to be observed. Thus, with an incandescent bulb, only a few fringes would be observed; alternatively, with a light emitting diode, several tens of fringes would be observed.

Figure 6:
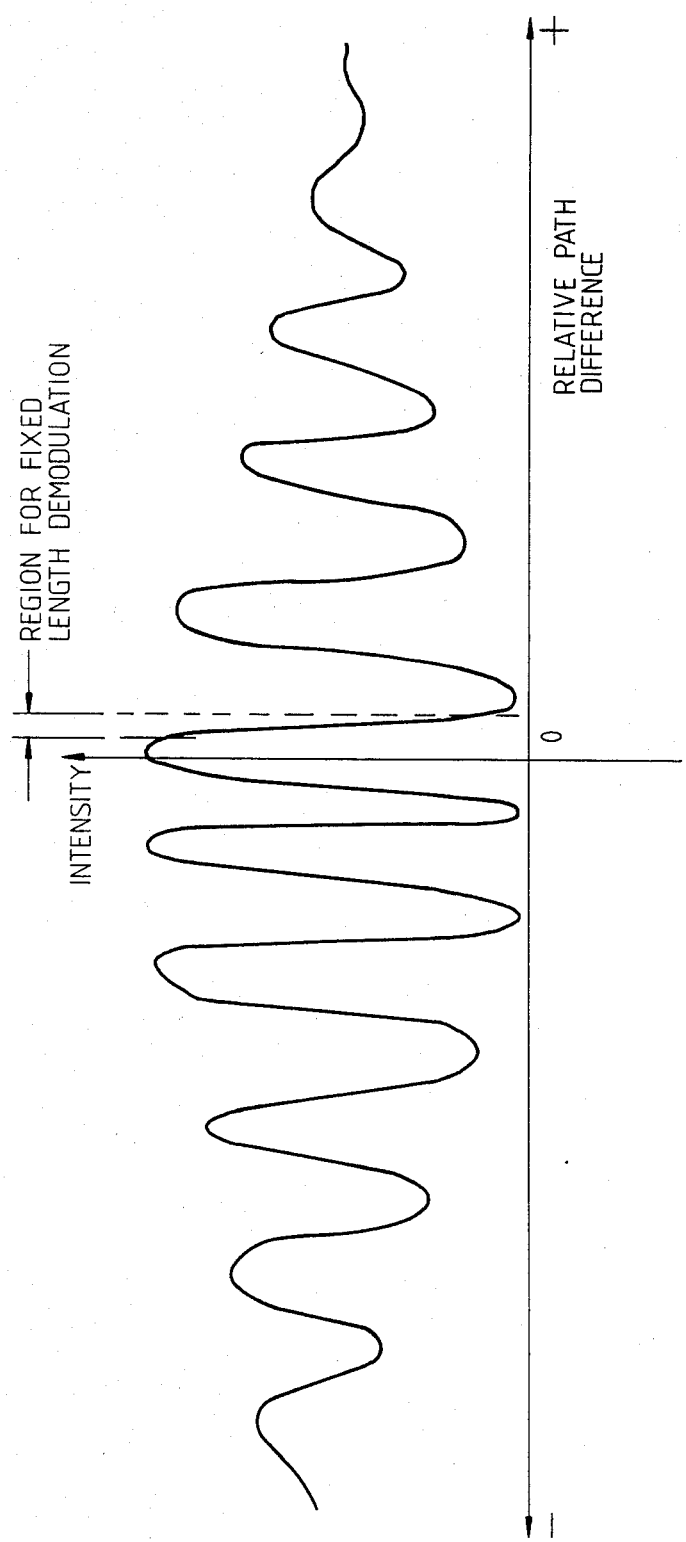
FIG. 6 is a graphic representation of the intensity output versus path difference (being an expansion of the coherence peak illustrated in FIG. 5b)
Figure 7:
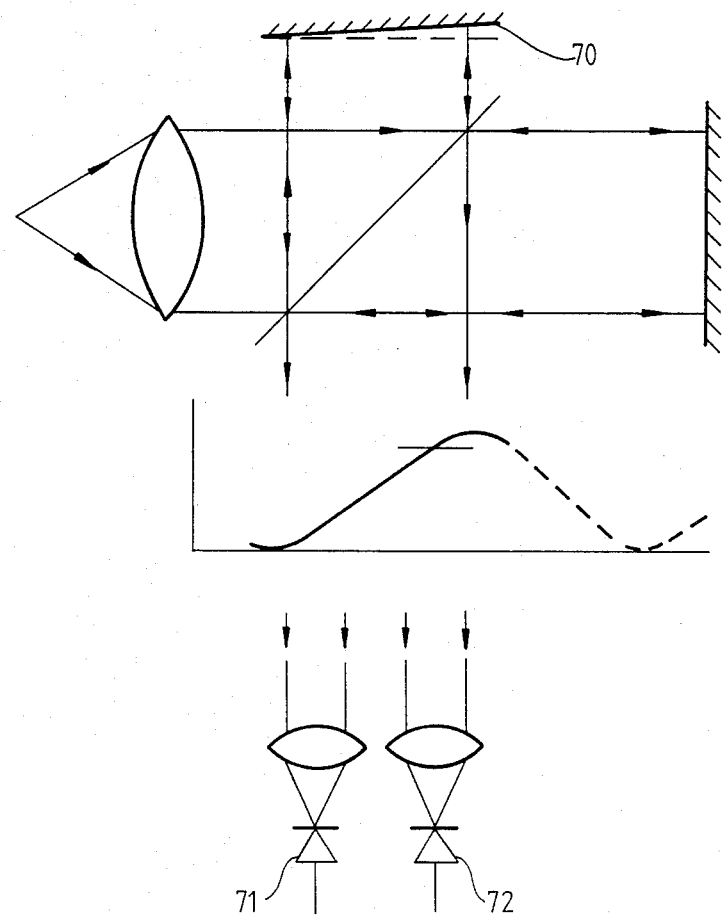

When used as a discriminator, the second interferometer 14 may be used at a fixed path difference. As the source interferometer path difference is modulated, the output of the second interferometer 14 will rise and fall accordingly, provided that there is approximately $\lambda/4 \pm n\lambda$ (90°) difference in the path differences, FIG. 6. Thus, using this technique, it is possible to monitor very small changes in path difference of the first interferometer 12 up to a maximum of approximately $\lambda/4$ (where $\lambda$ is the wavelength of the mean center frequency of the source), beyond which the discriminator "folds over" and there is ambiguity. This ambiguity may be overcome by the use of another receiver interferometer, whose path difference is $\lambda/4$ greater or smaller than that of the original receiver interferometer 14. If the outputs of these two interferometers are detected by photodetectors, the signals will correspond to in-phase and quadrature components and thus the ambiguity of direction and the fading problems can be avoided. A simpler alternative is to misalign one of the mirrors 70 of the interferometer 14 slightly and place two photodetectors 71 and 72 in the resultant fringe pattern as shown in FIG. 7.

A receiving Fabry-Perot etalon with slightly tilted mirror results in sharp fringe pattern which moves transversely with very small changes in input wavelength or transmitting interferometer path length. A change in path length of either interferometer equal to $\lambda$ will move the fringe pattern one complete fringe spacing.

The movement of the fringe may be detected with a photodetector (e.g. used in phase lock) or two or more photodetectors (a linear array of photodetectors will provide a readout of the precise fringe position).

Alternatively if visible light is used, observation of the white light fringe with the human eye is all that is necessary if only slow changes need to be observed (e.g. temperature, etc). This would be a completely optical information transmission system. The only exception might be the electrically powered light source, but daylight could be used.

Figure 8:
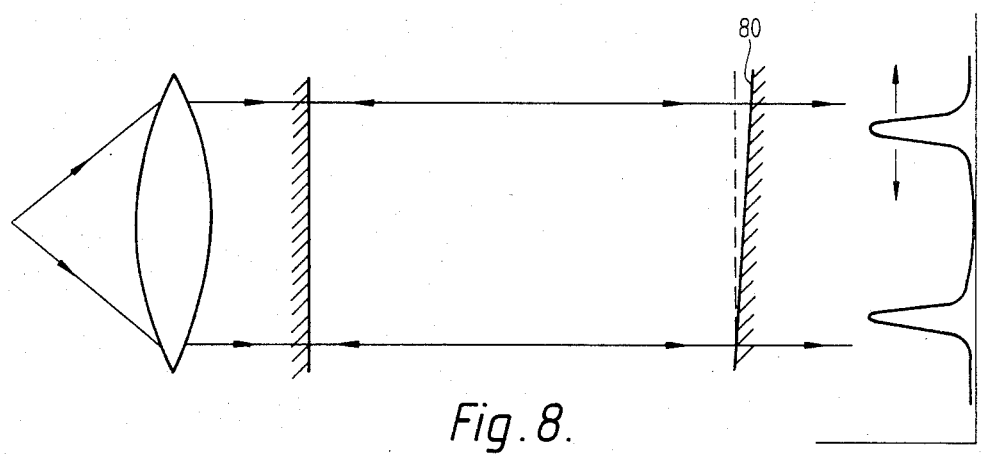
FIGS. 7 and 8 are diagrammatic views illustrating the use of misalignment in a receiving interferometer to demodulate an incoming signal.

A further possibility is to use several transducers each with a different colored filter in series. The resulting information may be transmitted via the same fiber and detected separately. A single receiver interferometer could be used, as in FIG. 8, with a misaligned mirror 80, in which different colored fringe lines would correspond to the respective sensors. This is wavelength multiplexing. It is also possible to multiplex several channels by cavity length multiplexing, i.e. receiver interferometers of different path differences to that of a given source interferometer will be insensitive to it.

The approach explained so far makes it possible to monitor absolute changes in transmitter interferometer path difference. Thus it can be used for remote measurement of strain, temperature, pressure, etc. It would also operate as a microphone if one acoustically modulated the path difference. The limit to the transmission bandwidth is, in the first instance, the rate at which the path difference can be modulated. This could be several GHz. Secondly, it is limited by mode dispersion and material dispersion in the transmission media, the latter being most significant with broadband sources.

The amplitude response is somewhat non-linear, being sinusoidal for the two path interferometer; this may be modified by the use of multi-path interferometers which in effect introduce the higher harmonics into the fringe pattern.

Figure 9:
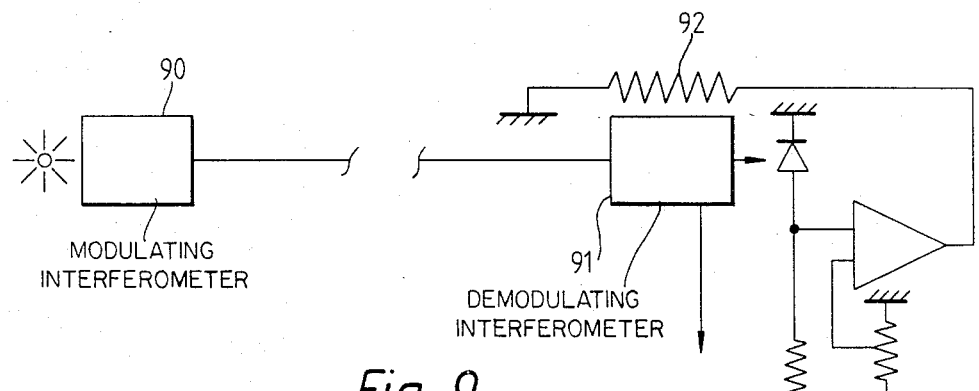
FIG. 9 is a diagrammatic view illustrating the use of a phase locked interferometer for telemetry.

An alternative approach to achieving linearity is to operate the receiver in the phase locked mode. In this arrangement, the output from the receiver interferometer 14 is compared with a fixed reference (corresponding to the required mean phase shift) and the error signal is averaged and fed back to adjust the receiver interferometer 14 to keep it in the correct phase relationship. If this system is wideband compared with the modulating signal, then the path difference of the receiver interferometer 14 will follow that of the transmitter interferometer 12. The required receiver output may be obtained by monitoring the error signal (if the control of the path difference is linear, e.g. the drive voltage applied to a piezoelectric device). Alternatively, the control of the path difference might be achieved by the same mechanism as is used for the sensor. A specific example is where the transmitting transducer is a temperature-sensitive Fabry-Perot etalon 90 of FIG. 9. The information to be transmitted is the temperature itself. The interferometer 91 at the receiver is a similar etalon, provided with a heater 92 which is driven by the amplified phase error signal from the receiver interferometer output. The system described will phase lock the second etalon 91 to the first etalon 90, and the temperatures will be identical. Therefore it is a simple matter to measure the temperature of the receiver etalon 91. This approach could be applied to other parameters such as strain and pressure. If true dc information is required, then the maximum range is half a fringe if ambiguities are to be avoided.

For an ac transmission system, i.e. where dc response is not required, the phase lock technique may be used to stabilize the interferometer output such that it is always on average half-way up a fringe, i.e. 90° phase shift (or $\pm n\lambda/4$, n=1, 2 ...) (see FIG. 6). In this case one would use a low loop bandwidth. The output is then simply the output of the interferometer 14 (in the form of intensity modulation which may be simply detected with a photodetector 15).

Figure 10A:
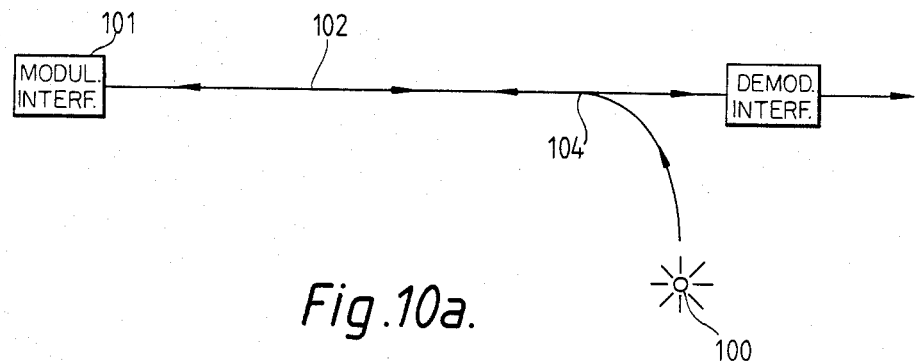
FIGS. 10a and 10b are diagrammatic views illustrating remote operation of a modulating interferometer.
Figure 10B:
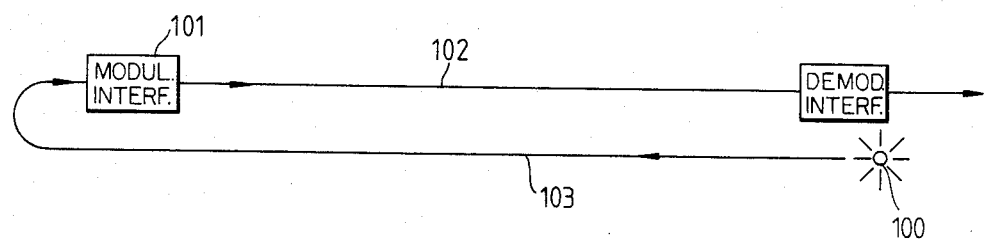

Although the system so far described is a single direction system with a source at one end and detector at the other, it is attractive in many applications to power the entire system from one end. As shown in FIG. 10, the light source 100 can be coupled to the modulator 101 via a second fiber 103 (FIG. 10b), being launched through a directional coupler 104. In this latter configuration it may be more convenient to use the power reflected by the first interferometer rather than the transmitted power. This has the effect of inverting the fringe pattern but all the systems described here will still work. This configuration may be very convenient for passive remote sensor applications, e.g. remote temperature or pressure monitors or remote microphones.

Figure 11:
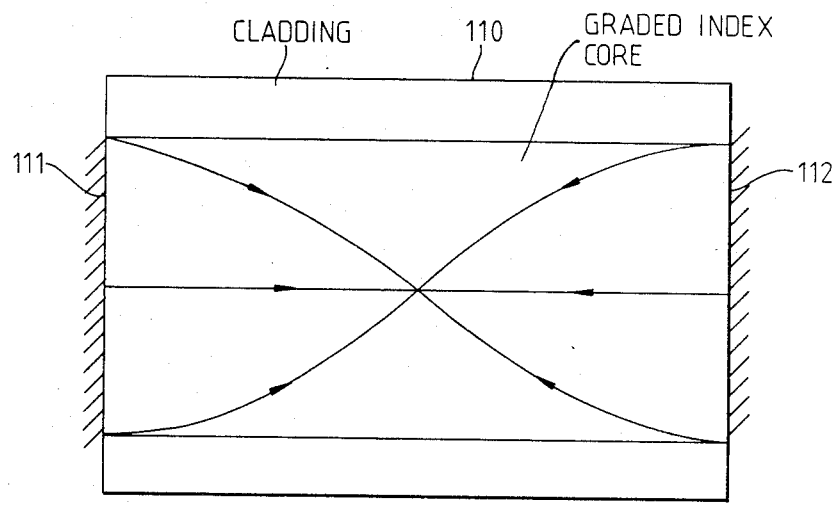
FIG. 11 is a diagrammatic view depicting a Fabry-Perot etalon using a length of graded index optical fiber.

It is possible that a very simple Fabry-Perot etalon might be fabricated from a single "period" length of graded index fiber as shown in FIG. 11. The length of fiber 110 has its ends 111, 112 formed optically flat and normal to the longitudinal axis of the fiber 110. The ends are then coated with partially reflecting films to form the resonant cavity.

Figure 12:
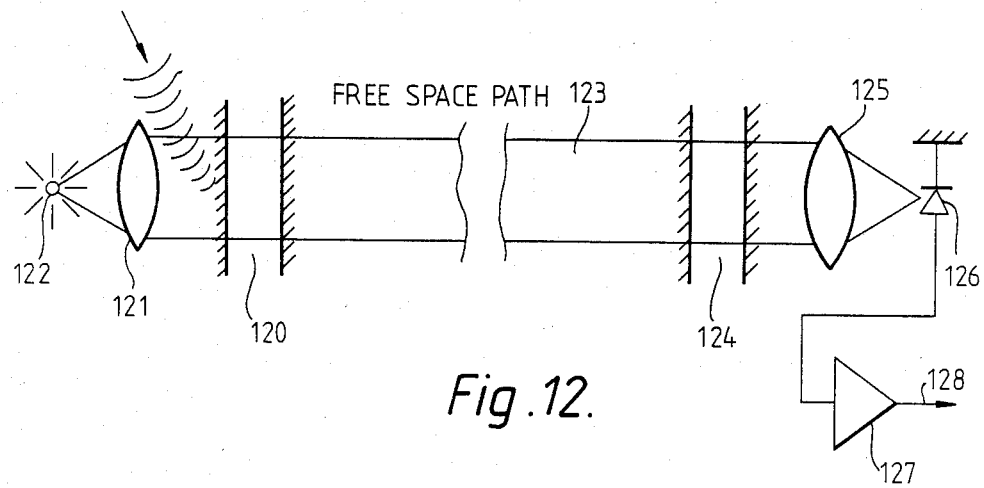
FIG. 12 is a diagrammatic view illustrating a simple free space optical FM transmission system.
Figure 13A:
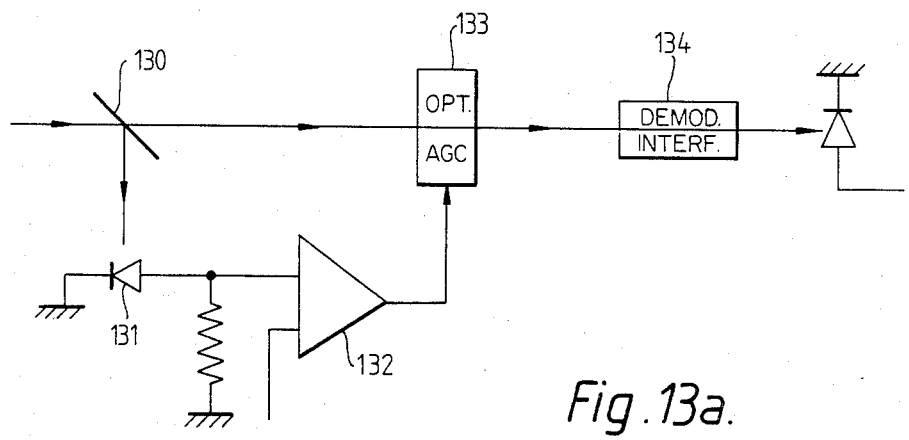
FIGS. 13a and 13b are diagrammatic views of two different implementations of a phase detector which is insensitive to amplitude.
Figure 13B:
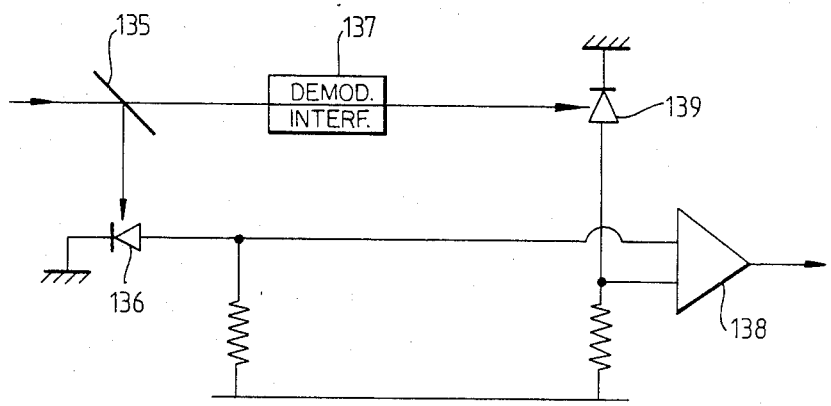

FIG. 12 shows another example of a simple link using an audio frequency modulator, e.g. a compliant etalon 120 upon which light is focused by means of a lens 121. The light source 122 can be a lamp or even sunlight. The signal from the modulator is propagated over free space path 123 and is received by a second etalon 124. The demodulated output of the etalon 124 is focused by a lens 125 onto a photodetector 126 which feeds an earpiece 128 via an amplifier 127. The use of frequency modulation should enable reduced sensitivity to fading to be achieved, but only if the receiver is sensitive to phase only. This can be achieved by either providing a fast optical automatic gain control (AGC) of the light entering the interferometer, as shown in FIG. 13a, or by dividing the output of the interferometer by a fraction of the light input, as shown in FIG. 13b. In the former approach, part of the optical input is fed via a beam splitter 130 to a photodetector 131. The photodetector output is compared in an amplifier 132 with a reference signal $V_{ref}$ and drives an electrically controlled optical attenuator 133, through which passes the remainder of the input signal passed by the beam splitter 130. The attenuator effects the AGC of the light entering the receiver interferometer 134. In the second approach, a part of the light input is also diverted, via a beam splitter 135, to a photodetector 136, while the rest of the input goes straight into the interferometer 137. The output of the photodetector 136 provides one input to a comparator 138, the other input of which is provided by a second photodetector 139 which receives the output of the interferometer 137. In effect, the output of the interferometer 137 is divided by a fraction of the light input.

While I have described above the principle of my invention in connection with specific apparatus, it is to be clearly understood that this description is made only by way of example and not as a limitation to the scope of my invention as set forth in the objects thereof and in the accompanying claims.

I claim:

1. An optical transmission system, comprising
a light source,
means for modulating the light emanating from said light source, including a first interferometer having variable optical properties and operative for issuing optical signals into an optical path for propagation therein, and means for imposing modulation onto said first interferometer to vary said optical properties thereof and thus to convert said optical output signals into modulated optical signals;
means for demodulating said modulated optical signals, including a second interferometer interposed in said optical path to receive said modulated optical signal propagating therein and operative for issuing a demodulated optical signal; and
means for converting said demodulated optical signal into an electrical signal, including a photodetector;
means for comparing said electrical signal with a fixed reference value and for generating an error signal representing the result of such comparison; and
means for adjusting said second interferometer in dependence on said error signal to maintain the same in constant phase relationship with said first interferometer.

2. The system as defined in claim 1, wherein said light source is situated adjacent said second interferometer; and further comprising means for applying the light from said light source to said first interferometer, including a length of an optical fiber.

3. The system as defined in claim 1, wherein said first interferometer is a two-path interferometer of the Mach-Zehnder type including an optically transmissive medium in one of the two paths; and wherein said imposing means includes means for changing the refractive index of the optically transmissive medium.

4. The system as defined in claim 1, wherein said first interferometer is a multi-path interferometer of the Fabry-Perot etalon type including two mirrors forming an optically resonant cavity: and wherein said imposing means includes means for moving one of said mirrors relative to one another.

5. The system as defined in claim 1, further comprising means for forming said optical path, including an optical fiber.

6. The system as defined in claim 1, wherein said second interferometer includes two mirrors which are misaligned in a predetermined direction relative to one another; and wherein said converting means includes an additional photodetector spaced from said photodetector in said predetermined direction in a plane normal to the axis of said optical path.

7. The system as defined in claim 1, wherein said light source is a source of incoherent light.

8. The system as defined in claim 1, wherein said modulating means includes means for acoustically modulating the operation of said first interferometer.

9. An optical transmission system, comprising:
a light source;
means for modulating the light emanating from said light source, including a first interferometer constructed as a two-path interferometer of the Michelson type having variable optical properties and operative for issuing optical signals into an optical path for propagation therein, including a wholly reflective mirror, and means for imposing modulation onto said first interferometer to vary said optical properties thereof and thus to convert said optical output signals into modulated optical signals, including means for moving said mirror in accordance with the modulation to be imposed;
means for demodulating said modulated optical signals, including a second interferometer interposed in said optical path to receive said modulated optical signals propagating therein and operative for issuing a demodulated optical signal; and
means for converting said demodulated optical signal into an electrical signal, including a photodetector.

10. An optical communication system comprising a light source operating at a mean center frequency wavelength $\lambda$;
  means for modulating the light emanating from said light source, including a first interferometer having variable optical properties and operative for issuing optical signals into an optical path for propagation therein, and means for imposing modulation onto said first interferometer to vary said optical properties thereof and thus to convert said optical output signals into modulated optical signals;
  means for demodulating said modulated optical signals, including a second interferometer interposed in said optical path to receive said modulated optical signals propagating therein and operative for issuing a demodulated optical signal and a third interferometer also receiving said modulated optical signal from said path and having an internal optical path differing by $\lambda/4$ from that of said second interferometer to issue an additional demodulated optical signal; and
  means for converting said demodulated optical signal into an electrical signal, including a photodetector and an additional photodetector operative for converting said additional demodulated optical signal into an additional electrical signal that is in phase quadrature with said electrical signal.

11. An optical transmission system, comprising
a light source;
  means for modulating the light emanating from said light source, including a first interferometer having variable optical properties and operative for issuing optical signals into an optical path for propagation therein, and means for imposing modulation onto said first interferometer to vary said optical properties thereof and thus to convert said optical output signals into modulated optical signals, at least one additional modulating interferometer arranged in parallel to said first interferometer and operative for issuing an additional modulated optical signal into said optical path, and at least two different colored optical filters one arranged in series with said first interferometer and the other with said additional interferometer as considered along the trajectories at propagation of light from said light source through the respective first and additional interferometers into said optical path;
  means for demodulating said modulated optical signals, including a second interferometer interposed in said optical path to receive said modulated optical signals propagating therein and operative for issuing a demodulated optical signal;
  and means for converting said demodulated optical signal into an electrical signal, including a photodetector.

12. An optical transmission system comprising
a light source;
  means for modulating the light emanating from said light source, including a first interferometer having variable optical properties and operative for issuing optical signals into an optical path for propagation therein, and means for imposing modulation onto said first interferometer to vary said optical properties thereof and thus to convert said optical output signals into modulated optical signals
  means for demodulating said modulated optical signals including a second interferometer interposed in said optical path to receive said modulated optical signals propagating therein and operative for issuing a demodulated optical signal;
  means for converting said demodulated optical signal into an electrical signal, including a photodetector;
  beam splitter means interposed in said optical path and operative for extracting a portion of the received light therefrom and diverting such extracted portion into an auxiliary optical path;
  an additional photodetector situated in the auxiliary path and operative for converting the optical signal propagating in the latter into an additional electrical signal; and
  automatic gain control means controlled by said additional electrical signal of said additional photodetector and operative for automatically controlling the optical gain in said optical path.

* * * * *